United States Patent [19]

Rossoll et al.

[11] Patent Number: 5,102,753
[45] Date of Patent: Apr. 7, 1992

[54] CONSTANT CURRENT SOURCE POWER SUPPLY

[75] Inventors: Mary P. Rossoll, Willoughby; Alan J. Revilock, Middleburgh Heights; George W. Moutsios, Parma, all of Ohio

[73] Assignee: Gould Inc., Eastlake, Ohio

[21] Appl. No.: 618,034

[22] Filed: Nov. 26, 1990

[51] Int. Cl.$^5$ .................................... H01M 00/00
[52] U.S. Cl. ................................ 429/192; 429/162; 429/7
[58] Field of Search ............. 429/192, 162, 224, 178, 429/218, 1, 7; 252/62.2

[56] References Cited

U.S. PATENT DOCUMENTS

| | | | |
|---|---|---|---|
| 4,539,275 | 9/1985 | Plasse | 429/152 |
| 4,623,598 | 11/1986 | Waki et al. | 429/162 |
| 4,654,279 | 3/1987 | Bauer et al. | 429/192 |
| 4,808,152 | 2/1989 | Sabalis | |

FOREIGN PATENT DOCUMENTS 88300869 2/1988 European Pat. Off. .

Primary Examiner—Anthony Skapars
Attorney, Agent, or Firm—Cornelius F. O'Brien; Michael A. Centanni

[57] ABSTRACT

A constant current source power supply comprising a flat solid electrolyte battery and a transistor-resistor current assembly second in series with the battery to provide a constant current supply from the battery.

10 Claims, 1 Drawing Sheet

U.S. Patent  Apr. 7, 1992  5,102,753
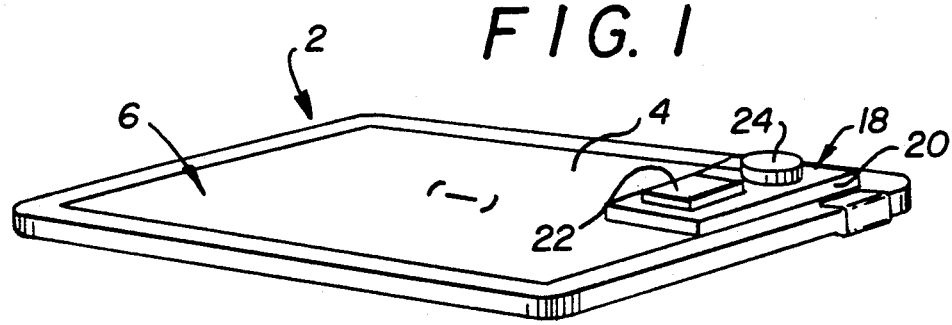
FIG. 1
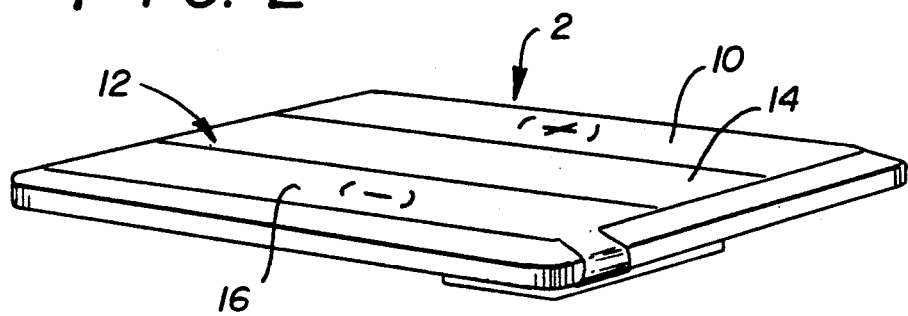
FIG. 2
FIG. 3
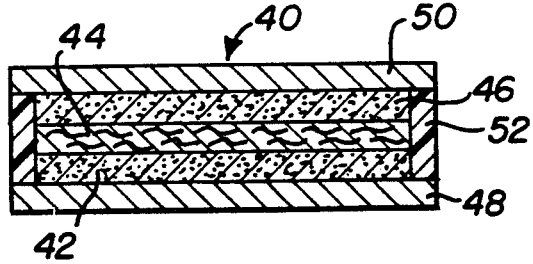
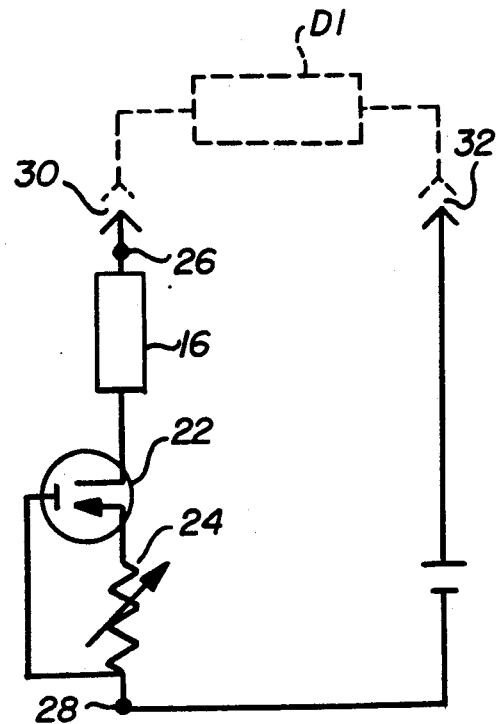
FIG. 4

CONSTANT CURRENT SOURCE POWER SUPPLY

FIELD OF THE INVENTION

The invention relates to a constant current source power supply comprising a flat solid electrolyte battery employing a solid electrolyte strip of poly(ethylene oxide) along with a lithium salt, ethylene carbonate and propylene carbonate, and a transistor-resistor assembly secured to said battery to insure a constant current supply for battery operated devices.

BACKGROUND OF THE INVENTION

Ionic conductivity is commonly associated with the flow of ions through a liquid solution of salts. In the vast majority of practical uses of ionic conductors, i.e., as electrolytes for dry cell and sealed lead acid batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization.

Improved microelectronic circuit designs have generally decreased the current requirements for electronic devices. This in turn has enhanced the applicability of solid electrolyte power sources which usually can deliver currents only in the microampere range. These solid electrolyte systems have the inherent advantages of being free of electrolyte leakage and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds seeking to find compounds which are solid at room temperature and have specific conductances approaching those exhibited by the commonly used liquid systems. Solid electrolytes must be essentially electronic insulators so as not to internally short the cell while at the same time they must allow for ionic migration if the cell is to operate properly. There are many solid state electrolytes disclosed in the art that can be used for solid state cells but many can only operate efficiently at higher temperatures, have low operating voltages, or have high resistance.

In some applications requiring a portable constant current source, a battery is appropriately arranged with a constant current device so as to provide a constant current. In some applications, the connection between a battery and a current regulating device requires insulated wires and careful attention to the polarity of the connections. The connections are commonly made by welding or soldering the leads together. In humid environments, these types of connections can corrode.

Constant current devices connected to flat aqueous battery have been used but when using such batteries there is always a tendency that the batteries could leak and short out the connections of the constant current devices.

It is an object of the present innovation to provide a constant current source power supply employing a flat solid electrolyte battery which is flexible and not subject to electrolyte leakage.

It is another object of the present invention to provide a constant current source power supply that employs a solid electrolyte battery and a constant current device composed of a transistor and resistor means mounted on a circuit board.

It is another object of the present invention to provide a constant current source power supply that employs a flexible flat solid electrolyte battery having a solid electrolyte separator strip of poly(ethylene oxide) along with a lithium salt, ethylene carbonate and propylene carbonate, and a transistor-resistor assembly electrically secured to said battery to insure a constant current supply.

SUMMARY OF THE INVENTION

The invention relates to a constant current source power supply employing a solid state battery comprising a solid state electrolyte of poly(ethylene oxide) with a lithium salt, ethylene carbonate and propylene carbonate, disposed between an active cathode and an active anode and all secured between a first current collector sheet serving as the top side and the first terminal for the battery, and a second current collector sheet, insulated from the first current collector sheet, serving as the bottom side and the second terminal of opposite polarity for the battery; a conductive strip secured to and insulated from the second current collector and extended onto and insulated from the first current collector sheet so that said conductive strip and the second terminal of the battery are disposed on the bottom side of the battery; and means for providing a constant current from the battery secured at one end to the conductive strip and at the other end to the first terminal on the top side of the battery so that said constant current means is connected in series to the battery whereby the conductive strips on the bottom side of the battery and the second current collection on the bottom side of the battery provide the external terminals of the battery.

Preferably, the current collectors for use in this invention are copper although nickel, stainless steel or any other suitable conductive material could be used. Preferably, the constant current source device would be a transistor or integrated circuit chip appropriably connected to a variable resistor so that when the constant current source is connected in series to the battery, the resistor can be adjusted to provide a constant current supply for a battery operated device. In some applications, a fixed resistor could be connected to the transistor to regulate and supply a constant current supply. Preferably a silicon type transistor or chip could be used with a variable type resistor and mounted onto a circuit board such as a ceramic board. The transistor and resistor would be secured to the ceramic circuit board and then the appropriated terminals of the circuit could be electrically connected to the first terminal and conductive strip on the top side of the battery. The electrical connections could be made by soldering or any conventional means that is employed in the printed circuit board art to connect electronic components a printed circuit board. The terminals on the board could then be electrically secured to the first terminal and conductive strip using a conductive epoxy such as a silver-based epoxy or wire bonded by spot welding or the like.

The flat battery of this invention is a solid electrolyte battery that preferably can be flexed to provide an arc of a circle having a radius of 2 inches, preferably 4 inches or more. Preferably, a battery about 30 millimeters long and 40 millimeters wide could be flexed to produce an arc shape from a circle having a radius of about 2 inches or more without any effective damage to the components of the battery. The constant current device could be positioned on one end of the battery near the edge so that the overall unit will occupy only a small space in a battery operated device. In addition, by having the constant current device at the edge of the battery, the variable resistor, if employed, can be easily adjusted.

The solid electrolyte strip for the battery could be fabricated from a composition of poly(ethylene oxide), referred to hereinafter as PEO, along with a lithium salt, the anion of which may, for example, be I, —Br—, $ClO_4$—, $SCN^-$, $BF_4^-$, $PF_6^-$ or $CF_3SO_3$. Added to this composition is ethylene carbonate and propylene carbonate. It has been found that ethylene carbonate is better than propylene carbonate as an electrolyte solvent because it has a higher electric constant, but has the disadvantage, when used in a liquid system in, that it is solid at room temperature. Thus, for solid electrolyte applications, ethylene carbonate would be the desired choice. However, it was discovered in copending application Ser. No. 421,085 filed Oct. 13, 1989 that the addition of propylene carbonate along with ethylene carbonate to a poly(ethene oxide)-containing solid electrolyte will effectively lower the temperature at which the polymer undergoes a transition from an amorphous form to a crystalline form thereby substantially eliminating the presence of a crystalline form of the polymer at temperatures about 20° C. This composition of a solid electrolyte is excellent for use in a solid electrolyte cell that can function at temperatures of about 20° C. and above. The polymeric solid electrolyte strip for use in this invention functions as a physical barrier between the anode and the cathode material, as well as, being ionically conductive at temperatures of above 20° C. The preferred composition of the solid electrolyte separator would be PEO-70wt/%(3EC-1PC)$_{20}$ LiClO$_4$. A method for making a battery suitably for use in this invention is disclosed in copending application Ser. No. 617993 filed concurrently herewith in the name of Mary P. Rossall and Alan S. Revilock. The disclosure of this application is incorporated herein by reference.

The cathode material for use in the battery of this invention can contain an active cathode material such as manganese dioxide ($MnO_2$), carbon monofluoride, vanadium oxide, silver vanadium chromate, metal chromate such as silver chromate and silver bismuth chromate; metal oxide such as nickel oxide, lead oxide, bismuth lead oxide and copper oxides; sulfides such as copper sulfides and iron sulfides; and cadmium. A carbonaceous material, if used, should preferably be carbon. The preferred carbonaceous material is acetylene or furnace black. The cathode material should also contain a material such as poly(ethylene oxide) with a lithium salt, the anion of which may, for example, be $I^-$, $Br^-$, $ClO_4^-$, $SCN^-$, $BF_4^-$, $PF_6^-$ or $CF_3SO_3$. The solvent for the cathode material could be ethylene carbonate dissolved with propylene carbonate.

The anode material for use in the battery is preferably lithium although calcium, sodium or the like could be used.

A method for producing a solid electrolyte cell for use in the invention would comprising the steps (a) depositing an active cathode material onto a first conductive current collector sheet and within an adhesive coated frame positioned at the peripherally area of the current collector sheet; (b) placing a solid electrolyte separator strip onto the cathode material, said separator strip being smaller than the area of the cathode collector sheet and larger than the exposed area of the cathode material thereby leaving a portion of the adhesive coated frame area exposed; (c) placing an anode strip onto the separator and within the frame thereby leaving an exposed portion of the area of the adhesive coated frame; (d) placing a second conductive current collector substantially the size of the first conductive current collector onto the anode and exposed area of the adhesive coated frame; and (e) heating at least the frame area of the cell assembly at a pressure and temperature for a period of time sufficient to secure the first current collector to the adhesive coated frame on one side and the opposite side of the adhesive coated frame to the second current collector thereby producing a sealed battery.

As stated above, the current collectors for use in this invention could be copper, nickel, stainless steel or the like, with copper being the preferred current collectors. Preferably the thickness of the current collector for most applications could be from 0.0005 to 0.003 inch thick. The adhesive coated frame could be made of a plastic material such as polyester, polyethylene or the like. Any suitable adhesive can be employed as long as it can seal the current collectors together and provide at least a liquid tight seal. Some examples of an adhesive are ethylene vinyl acetate (EVA), polyethylene, ethylene acrylic acid (EAA), with EVA being the preferred adhesive.

The frame area of at least the assembled cell should be heated under pressure to insure that the adhesive will firmly secure the current collectors to the frame. For most applications, the cell assembly could be heated for about 125° to 200° C. at a vacuum of at least 20 inches and at a pressure between 40 and 100 psig for as little as 3 seconds.

The present invention will become more apparent from the following description thereof when considered therein with the accompanying drawing which is set forth as being exemplary of an embodiment of the present invention and is not intended in any way to be limitative thereof.

BRIEF DESCRIPTION OF THE DRAWINGS

FIG. 1 is an isometric view of a constant current source power supply of this invention.

FIG. 2 is an isometric view of the constant current source power supply of FIG. 1 shown inverted.

FIG. 3 is an enlarged cross-sectional view of a solid electrolyte battery for use in this invention.

FIG. 4 is a schematic diagram of a circuit for the constant current source shown in FIG. 1.

FIGS. 1 and 2 show a constant current source power supply 2 of this invention comprising a first current collector 4 on the top side 6 of battery 8 and serving as the negative terminal of battery 8. A second current collector 10, on the bottom side 12 of battery 8, serves as the positive terminal for battery 8. On the bottom side 12 an insulator 14, such as a glassine insulating paper, is secured over a portion of current collector 10. Conductive strip 16 is secured over insulator 14 and extended over and onto current collector 4. Again the insulator 14 is secured and insulated from current collector 4 on top side 6. The conductive strip 16 could be secured to the insulator 14 using an adhesive or the insulator 14 could be a double sided insulator tape. In this assembly, conductive strip 16, which could be copper, is insulated from both the negative and positive terminals of the battery.

A constant current supply circuit assembly 18 is composed of a board 20, such as a ceramic board, containing a transistor 22 and variable resister 24. The transistor 22 is connected to the resister as shown in FIG. 4 in which the two terminals 26 and 28 are metal contacts on the bottom of the board 20 for surface mounting to the battery 8. One terminal 26 is electrically connected to current collector 4 and its other terminal 28 is connected to conductive strip 16 thereby placing assembly 18 in series with the battery 8 as shown in FIG. 4. The output terminal of the constant current source power supply 2 is shown in FIG. 2 which is the exposed current collector 10 and conductive strip 16 on the bottom side 12. To secure the terminals 26 and 28 to current collector 4 and conductive strip 16, respectively, a conductive epoxy can be used such as a silver epoxy. For example, an amount of epoxy is placed on both metal contacts of assembly 18 and the metal contact 28 is attached to current collector 4 with the metal contact 26 attached to conductive strip 16. The epoxy, preferably silver epoxy, is therefore used to secure the electrical attachment of assembly 18 to battery 8. In operation, the variable resistor 24 is adjusted for the desired current output.

FIG. 4 shows a schematic diagram of the circuit of the constant current source power supply. Specifically, a transistor 22 is shown connected at one end to conductive strip 16 and at the other end to variable resister 24. The central terminal of transistor 24 is shown connected to the other terminal of variable resistor 24 which is also connected to the negative terminal of battery 8 via current collector 4. Thus the transistor 22 and resister 24 are placed in series with the battery 8. The output terminals of the constant current source power supply is shown as terminal 30 from conductive strips 16 and terminal 32 from the positive terminal of battery 8. Shown in broken lines is a battery power device D1 which can be powered by the constant current source power supply of this invention.

FIG. 3 shows an enlarged cross-sectional view of a solid electrolyte battery 40 suitable for use in this invention. Specifically, solid electrolyte battery 40 comprises a laminated structure of a cathode material 42, solid electrolyte separator 44 and anode strip 46 disposed between a first current collector 48 and a second current collector 50. The current collectors 48 and 50 are sealed at their peripheral areas by an adhesive coated frame 52. The overall assembled battery produced can be used with the constant current supply device to operate any electrical device designed to operate at a constant current.

EXAMPLE

A 9 volt bipolar flat battery was made using a cathode comprising manganese dioxide and carbon to which was added a portion of a solid electrolyte composed of poly(ethylene oxide), LiClO$_4$ salt, ethylene carbonate and propylene carbonate along with a solvent of methanol. The cathode was deposited on a copper current collector sheet and then an adhesive frame was placed onto the copper collector in which the cathode material was positioned within the frame.

A thin piece of a solid electrolyte (separator) was placed on top of the manganese dioxide electrode within the adhesive frame. The composition of the solid electrolyte was poly(ethylene oxide), a lithium salt of LiClO$_4$, ethylene carbonate and propylene carbonate. A piece of lithium was placed on top of the solid electrolyte, followed by a second sheet of copper approximately the same size as the first copper sheet the assembly was heated under pressure so that the peripheral adhesive frame was sealed to the copper collectors thereby providing a sealed Li/MnO$_2$ cell. Three such batteries, each being 3 volts were connected in series with one current collector removed from two of the batteries so that a bipolar construction was obtained having no double current collector in the assembly.

A constant current supply device composed of a ceramic (96% alumina) board containing a transistor (integrated circuit chip) known as SST 202 and obtained from Seliconix Corporation and a trim pot or variable resister known as Bourns Model 3304 (50K ohms) obtained from Bourns Corporation mounted and electrically connected as shown in FIG. 4. The constant current supply device was attached to the battery as shown in FIGS. 1, 2 and 4 using silver epoxy. After complete assembly, the resistor could be adjusted to provide a desired current for operating a battery powdered device.

It is to be understood that modifications and changes to the preferred embodiment of the invention herein described can be made without departing from the spirit and scope of the invention. For example, the terminals of the constant current source power supply could be positioned anywhere on the device so as to accommodate a particular battery operated device. In addition any electronic component such as a fixed resistor, could be used with the batteries so as to provide a constant current source. For example, the resistor could be laser trimmed to provide a fixed resistance for the device.

What is claimed:

1. A constant current source power supply employing a solid state, battery comprising a solid state electrolyte of poly(ethylene oxide), a metal salt, ethylene carbonate and propylene carbonate disposed between an active cathode and an active anode and all secured between a first current collector sheet serving as the top side and the first terminal for the battery, and a second current collector sheet, insulated from the first current collector sheet, serving as the bottom side and the second terminal of opposite polarity for the battery; a conductive strips secured to and insulated from the second current collector and extended onto and insulated from the first current collector so that said conductive strip and the second terminal of the battery are disposed on the bottom side of the battery; and means for providing a constant current from the battery secured at one end to the conductive strips and at the other end to the first terminal on the top side of the battery so that the constant current means is connected in series with the battery.

2. The constant current source power supply of claim 1 wherein the conductive strip on the bottom side of the battery and the second current collector provide the external terminals for the power supply.

3. The constant current source power supply of claim 1 wherein the first current collector is the negative terminal and the second current collector is the positive terminal of the battery.

4. The constant current source power supply of claim 1 wherein the means for providing a constant current comprising a transistor and a variable resistor.

5. The constant current source supply of claim 1 wherein said first current collector and said second current collector is selected from the group consisting of copper, nickel and stainless steel.

6. The constant current source power supply of claim 5 said first current collector and said second current collector are copper.

7. The constant current source power supply of claim 1 wherein said cathode material contains an active cathode material selected from the group consisting of manganese dioxide, iron sulfides, copper sulfides, silver chromates, lead oxides, bismuth oxides, copper oxides, nickel oxides, carbon monofluoride, vanadium oxide, silver vanadium chromate and cadmium.

8. The constant current source power supply of claim 7 wherein the active cathode material is manganese dioxide.

9. The constant current source power supply claim 1 wherein the cathode material comprises manganese dioxide and carbon and the anode strip is lithium.

10. The constant current source power supply of claim 9 wherein the first current collection, second current collector and conductive strip are copper.

* * * * *